United States Patent Office 2,809,993
Patented Oct. 15, 1957

2,809,993
PROCESS FOR PREPARATION OF MONOCHLOROACETIC ACID

Gerald M. Glavin and Harold B. Stevens, Shawinigan Falls, Quebec, Canada, assignors to Shawinigan Chemicals Limited, Montreal, Quebec, Canada, a corporation of Canada No Drawing. Application April 20, 1955,
Serial No. 502,748

7 Claims. (Cl. 260—539)

This invention relates to the preparation of monochloroacetic acid and in particular to a commercially feasible method for production of monochloroacetic acid of high quality by the monochlorination of acetic acid.

It is well known that acetic acid can be chlorinated in the presence of acetyl chloride, which can conveniently be formed in situ during chlorination by addition of acetic anhydride to the acetic acid. It is also known that, in the chlorination of acetic acid, formation of dichloroacetic acid occurs, and the dichlorination product starts to form before all the acetic acid being chlorinated has been converted to the monochlorination product. Hence it is the practice, in an effort to minimize the formation of dichloroacetic acid, to chlorinate acetic acid to not more than about 80% conversion, i. e. chlorination is stopped before more than about 80% of the acetic acid has been converted to monochloroacetic acid. However, even at this incomplete degree of conversion, the amount of dichloroacetic acid formed along with the monochloroacetic acid can amount to several percent of the reacted acetic acid. The dichloroacetic acid not only contaminates the monochlorination product, but also reduces the yield of product desired from the reactants. The yield of product based on acetic acid required is further lowered by the fact that considerable monochloroacetic acid must usually be discarded in separating and disposing of dichloroacetic acid.

It is an object of this invention to prepare monochloroacetic acid in high yield and purity by the monochlorination of acetic acid. It is a further object to carry out the monochlorination of acetic acid with minimal production of dichloroacetic acid impurity and minimal addition of foreign materials.

It has been observed that certain substances inhibit the dichlorination of acetic acid without inhibiting the monochlorination thereof. It has been proposed to carry out the monochlorination of batches of acetic acid in the presence of large effective quantities of these substances, and subsequently to separate the monochloroacetic acid from the crude product by distillations. However, the distillation separations are expensive, and nothing is known of the loss of yield through polychlorination products discarded as distillation residues.

It has now been found that acetic acid can be chlorinated to monochloroacetic acid, with minimal concurrent formation of dichloroacetic acid, with no loss in yield through discard of residues containing concentrated impurities, and with no complex expensive distillation for product recovery. The invention consists of a sequence of reaction and recovery steps which, in combination, produce a monochloroacetic acid product containing an amazingly low proportion of dichloroacetic acid. The process of the invention comprises continuously introducing acetic acid, chlorine and sulfuric acid into a reaction zone containing a mixture comprising predominantly acetic acid, monochloroacetic acid, and dichloroacetic acid, said sulfuric acid being between 0.1% and 0.5% by weight of said introduced acetic acid, and particularly and preferably a proportion in the range below 0.3%, said mixture being held in the temperature range between about 90 and 110° C., the relative rates of chlorine and acetic acid addition being adjusted to maintain the setting point of the reaction mixture at a temperature above about 25° C., preferably between 30° and 45° C. and most preferably between 35° and 40° C., adding at least one material of the group consisting of acetyl chloride and acetic anhydride to the reaction mixture to maintain a concentration of above 3%, preferably between 4% and 6.5% by weight, of precipitatable chlorides calculated as acetyl chloride in the reaction mixture, continuously withdrawing a proportion of the reaction mixture from the reaction zone, cooling the withdrawn portion of reaction mixture to a temperature below the setting point, preferably between 0° and 30° C. and most preferably between about 18° and 22° C., to precipitate monochloroacetic acid crystals in mother liquor, separating the crystals from the mother liquor, and recycling all the mother liquor to the reaction zone by continuous addition thereof to the reaction zone. The setting point is the temperature at which monochloroacetic acid crystals begin to precipitate from the reaction mixture on cooling of the latter.

It has been found in this process of continuous chlorination in the presence of recycled mother liquor and the small indicated proportions of sulfuric acid, that the concentration of dichloroacetic acid in the reaction zone does not increase continuously, but remains below a value of about 8%. With this apparent dynamic equilibrium concentration, a reaction mixture, on cooling to a temperature below the setting point, deposits monochloroacetic acid crystals which, with the mother liquor adhering after commercial separation, contain less than 1% dichloroacetic acid. The mother liquor recycled to the reaction zone contains a slightly lesser weight of dichloroacetic acid than the reaction mixture removed from the reaction zone, the difference being the dichloroacetic acid contaminating the monochloroacetic acid crystals, which is the only dichloroacetic acid removed from the system, and amounts to less than 1% of the monochloroacetic acid crystals separated. There being no other removal of dichloroacetic acid from the system, and the equilibrium concentration thereof in the reaction zone remaining substantially constant, it is obvious that the amount of dichloroacetic acid being formed continuously in the reaction zone is less than 1% of the amount of monochloroacetic acid being formed. This is an entirely unexpected result, as it had not previously been known that a low equilibrium concentration of dichloroacetic acid could be maintained in a reaction zone wherein acetic acid is being chlorinated continuously, and it could not be predicted that a low dynamic equilibrium concentration could be maintained with mother liquor containing dichloroacetic acid being recycled to the reaction zone.

It should be noted that most of the impurity in the monochloroacetic acid crystals produced by this process consists of mother liquor, and that the highest quality crystals are obtained by the most efficient separation thereof from the mother liquor. The composition of the mother liquor formed in this process is usually in the range of 60–65% monochloroacetic acid, 22–26% acetic acid, 12–14% dichloroacetic acid, and about 1% free chlorides, chiefly HCl. Obviously the presence of mother liquor on the monochloroacetic acid crystals lowers their melting point, and the melting point of the crystals can be taken as an indication of their purity. Hence the separation step in the process of this invention is important, since the degree of contamination of the crystals will depend on the efficiency of the separation step.

Separation may be carried out for example by filtering or centrifuging the crystals of monochloroacetic acid. Suction filtering is effective, the suction serving additionally to draw air through the crystals to aid in removing mother liquor therefrom. Centrifuging is a highly practicable method of separating crystals from the mother liquor on a commercial scale, and crystals of over 98% purity are readily obtained by this method of separation from the reaction mixture produced according to the present invention.

The following example will illustrate a commercial application of the process to the production of monochloroacetic acid. The reaction step was carried out in two series connected heated 350 gallon reaction vessels. Acetic acid, containing $H_2SO_4$ dissolved therein, was introduced continuously to the first vessel, along with acetic anhydride and with recycled mother liquor from the recovery step. Liquid overflowing continuously from the first vessel was introduced to the second vessel. Chlorine gas was continuously dispersed into the liquid in the second vessel, and gases escaping the second vessel were conducted to the first vessel and dispersed in the liquid therein. Gases evolved in and escaping the first vessel were vented through condensers, and condensed liquid therefrom returned to the first vessel. Liquid overflowing continuously from the second vessel was accumulated into batches and cooled to precipitate monochloroacetic acid in mother liquor. The crystals and mother liquor were then separated by centrifuging the liquor from the crystals, and the liquor was recycled for continuous addition to the first vessel.

The specific conditions for the various steps of the process in the example when a steady (dynamic) equilibrium flow had been reached, were as follows:

| | |
|---|---|
| Rate of addition of fresh acetic acid to first vessel | 260 lbs./hr. |
| Proportion of $H_2SO_4$ in fresh acetic acid | 0.2% by weight. |
| Rate of addition of recycled mother liquor to first vessel. Various, averaging about | 600 lbs./hr. |
| Proportion of $H_2SO_4$ in recycled mother liquor | 0%. |
| Rate of addition of chlorine to second vessel | 250 lbs./hr. |
| Rate of addition of fresh acetic anhydride to first vessel | 20 lbs./hr. |
| Proportion of $H_2SO_4$ in fresh acetic anhydride | 0%. |
| Proportion of $H_2SO_4$ in total liquids entering first vessel | 0.059%. |
| Temperature maintained in first vessel | 95° C. |
| Temperature maintained in second vessel | 100° C. |
| Setting point of reaction mixture overflowing from second vessel | 37° C. |
| Temperature of mother liquor during separation of monochloroacetic acid crystals | 20° C. |
| Melting point of the recovered monochloroacetic acid | 61.1° C. |

Analysis of crystal product:

| | Percent |
|---|---|
| Monochloroacetic acid | 98.5 |
| Dichloroacetic acid | 0.72 |
| HCl | 0.02 |
| Acetic acid | 0.62 |
| Water | 0.03 |
| Sulfur (calc. as $H_2SO_4$) | 0.11 |

It will be noted that no provision is made for separating the $H_2SO_4$, used as an inhibiting catalyst, from the reaction products. It is found that the quantity of $H_2SO_4$ used is so small, and the resulting contamination of the product is so small, that it is unnecessary and impracticable to make such separation. This is distinctly different from and advantageous over the prior processes wherein the inhibiting catalyst had to be separated from the reaction product.

It is further found that the sulfuric acid is decomposed or reacted in some manner during the chlorination of the acetic acid, since, by standard analytical methods, no sulfuric acid can be detached in the crystalline monochloroacetic acid product or in the mother liquor recycled to the chlorination reaction zone. The absence of sulfuric acid in recycled mother liquor was noted in the foregoing example. The crystalline product and recycled mother liquor must obviously contain some sulfur, and by fusion with sodium carbonate and potassium nitrate the sulfur can be detected and analyzed as sulfate. By this method the monochloroacetic acid product of the foregoing example was determined to have a sulfur content of 0.11% calculated as sulfuric acid, but there was no sulfuric acid or sulfate ion detectable in the crystals. The dynamic equilibrium of sulfur through the process would theoretically provide 0.127% sulfur calculated as sulfuric acid in the crystals in this example with 0.2% sulfuric being added with the acetic acid, assuming no sulfur to be vented with by-product hydrogen chloride. The foregoing observed value is in close agreement with this calculated value.

What is claimed is:

1. A process for the manufacture of monochloroacetic acid comprising (1) continuously introducing acetic acid, chlorine, and sulfuric acid into a reaction zone containing a mixture of acetic acid, monochloroacetic acid, and dichloroacetic acid, said sulfuric acid being between about 0.1% and 0.5% by weight of said introduced acetic acid, said mixture being held in the temperature range between about 90° C. and 110° C., the relative rates of chlorine and acetic acid addition being adjusted to maintain the setting point of the reaction mixture at a temperature above about 25° C., (2) adding at least one material of the group consisting of acetyl chloride and acetic anhydride to the reaction mixture to maintain a concentration of above about 3% by weight of precipitatable chlorides calculated as acetyl chloride in the reaction mixture, (3) continuously withdrawing a proportion of the reaction mixture from the reaction zone, (4) cooling the withdrawn portion of reaction mixture to a temperature below the setting point to precipitate monochloroacetic acid in mother liquor, (5) separating the crystals from the mother liquor, and (6) recycling all the mother liquor to the reaction zone by continuous addition thereof to the reaction zone.

2. A process as claimed in claim 1, in which the sulfuric acid comprises between 0.1% and 0.3% by weight of the acetic acid introduced.

3. A process as claimed in claim 2 in which the relative rates of chlorine and acetic acid addition are adjusted to maintain the setting point of the reaction mixture between 30° C. and 45° C.

4. A process as claimed in claim 3 in which the relative rates of chlorine and acetic acid addition are adjusted to maintain the setting point of the reaction mixture between 35° C. and 40° C.

5. A process as claimed in claim 4, in which acetic anhydride is added to the reaction zone in quantity to maintain a concentration of between 4% and 6.5% by weight of precipitatable chlorides calculated as acetyl chloride in the reaction mixture.

6. A process as claimed in claim 5, in which the reaction mixture is cooled to a temperature between 0° C. and 30° C. to precipitate the monochloroacetic acid.

7. A process as claimed in claim 6, in which the reaction mixture is cooled to a temperature between 18° C. and 22° C. to precipitate the monochloroacetic acid.

References Cited in the file of this patent

UNITED STATES PATENTS 2,539,238    Eaker ---------------- Jan. 23, 1951

OTHER REFERENCES

Shivlov: "The Chlorination of Acetic Acid," Chemical Abstracts, vol. 24, pp. 827–28, 1930.